United States Patent [19]

Abu-Isa et al.

[11] Patent Number: 4,545,614

[45] Date of Patent: Oct. 8, 1985

[54] THIN ELASTOMERIC SEAT

[75] Inventors: Ismat A. Abu-Isa, Rochester; Dorthie J. McIntyre, Sterling Heights, both of Mich.

[73] Assignee: General Motors Corporation, Detroit, Mich.

[21] Appl. No.: 578,686

[22] Filed: Feb. 9, 1984

[51] Int. Cl.$^4$ .............................................. A47C 3/00
[52] U.S. Cl. ................................... 297/284; 297/452; 297/441; 297/445
[58] Field of Search ............... 297/452, 445, 441, 284, 297/455; 5/191

[56] References Cited

U.S. PATENT DOCUMENTS

| | | | |
|---|---|---|---|
| 2,251,318 | 8/1941 | Blair et al. | 297/455 X |
| 2,806,510 | 9/1957 | Walker | 297/63 |
| 3,273,877 | 9/1966 | Geller et al. | 297/284 X |
| 3,466,085 | 9/1969 | Webb | 5/191 |
| 3,751,110 | 8/1973 | Shaw | 5/191 |
| 3,840,913 | 10/1974 | Feische | 5/191 |
| 4,155,592 | 5/1979 | Tsuda et al. | 297/284 |
| 4,278,288 | 7/1981 | Thebaud | 297/445 |
| 4,456,301 | 6/1984 | Apissomian | 297/445 |
| 4,469,738 | 9/1984 | Himelreich, Jr. | 297/452 |

*Primary Examiner*—Francis K. Zugel
*Attorney, Agent, or Firm*—William A. Schuetz

[57] ABSTRACT

The disclosure relates to a vehicle seat assembly comprising a tubular frame means for a seat and backrest, a seat and backrest comprised of side by side elastomeric filaments prestretched across the seat frame and backrest frame and secured to the frame portions and a cover means to cover the seat and backrest whereby a thin seat is provided.

3 Claims, 6 Drawing Figures

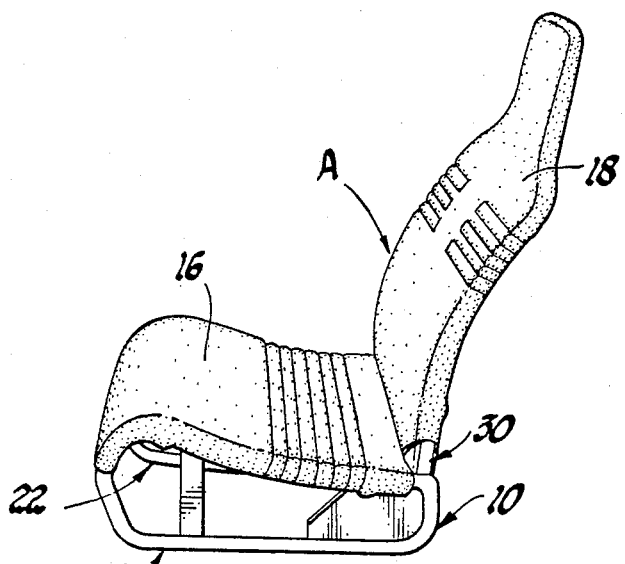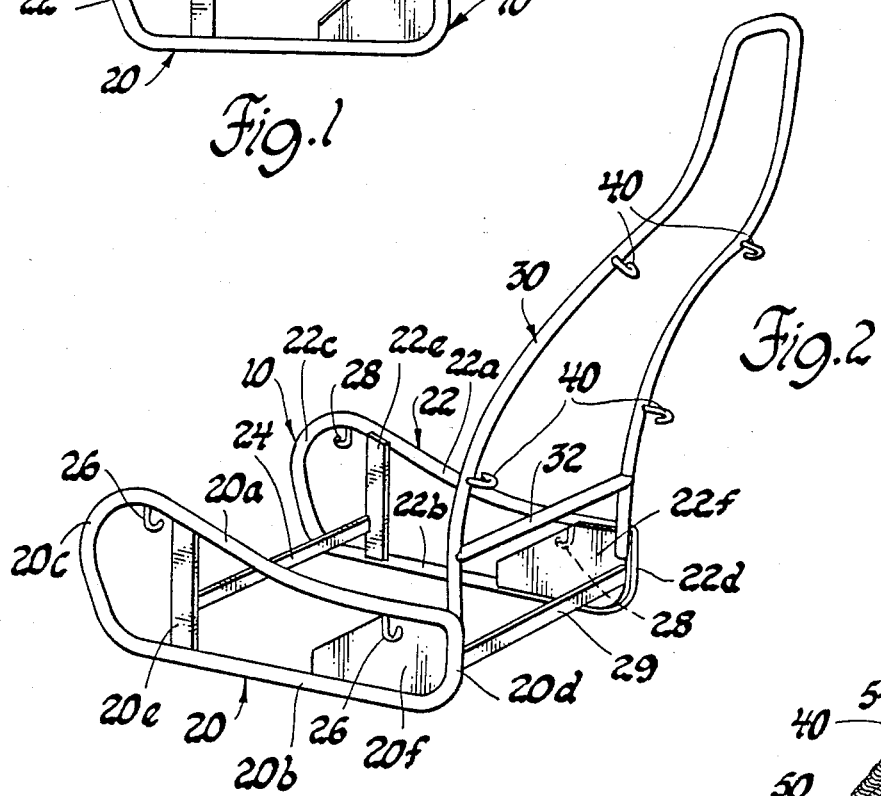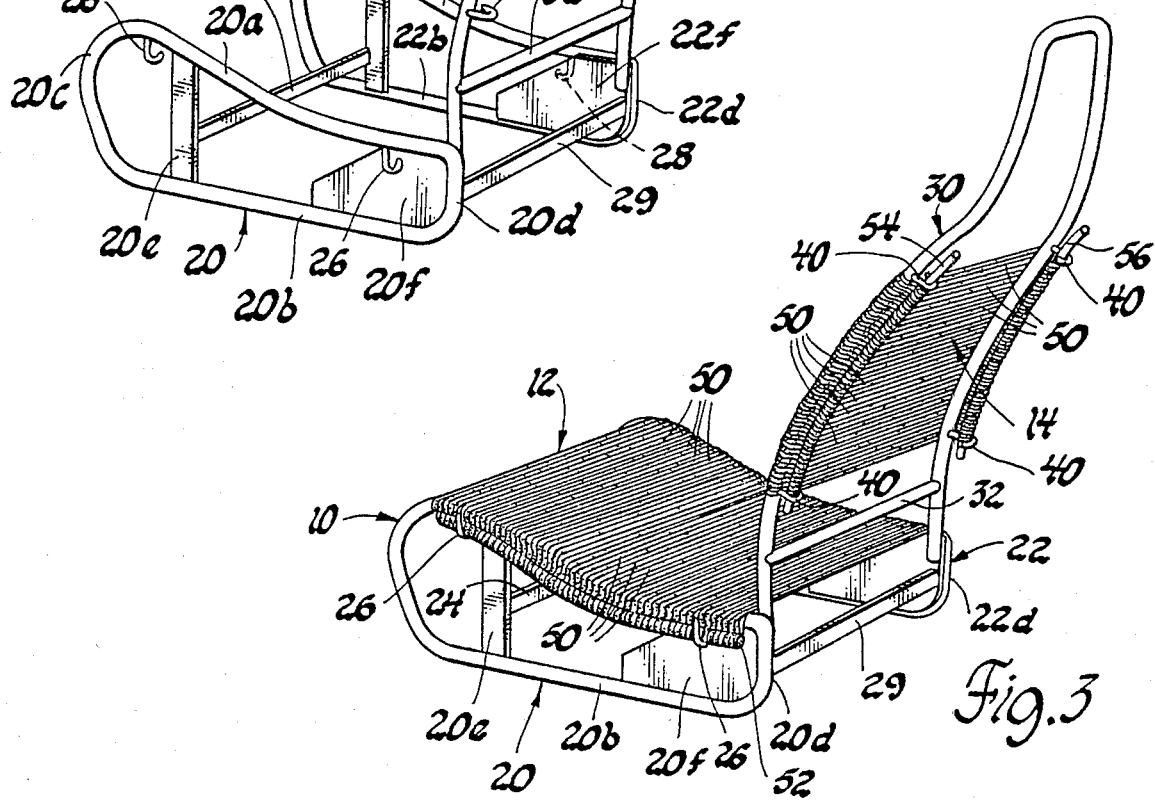

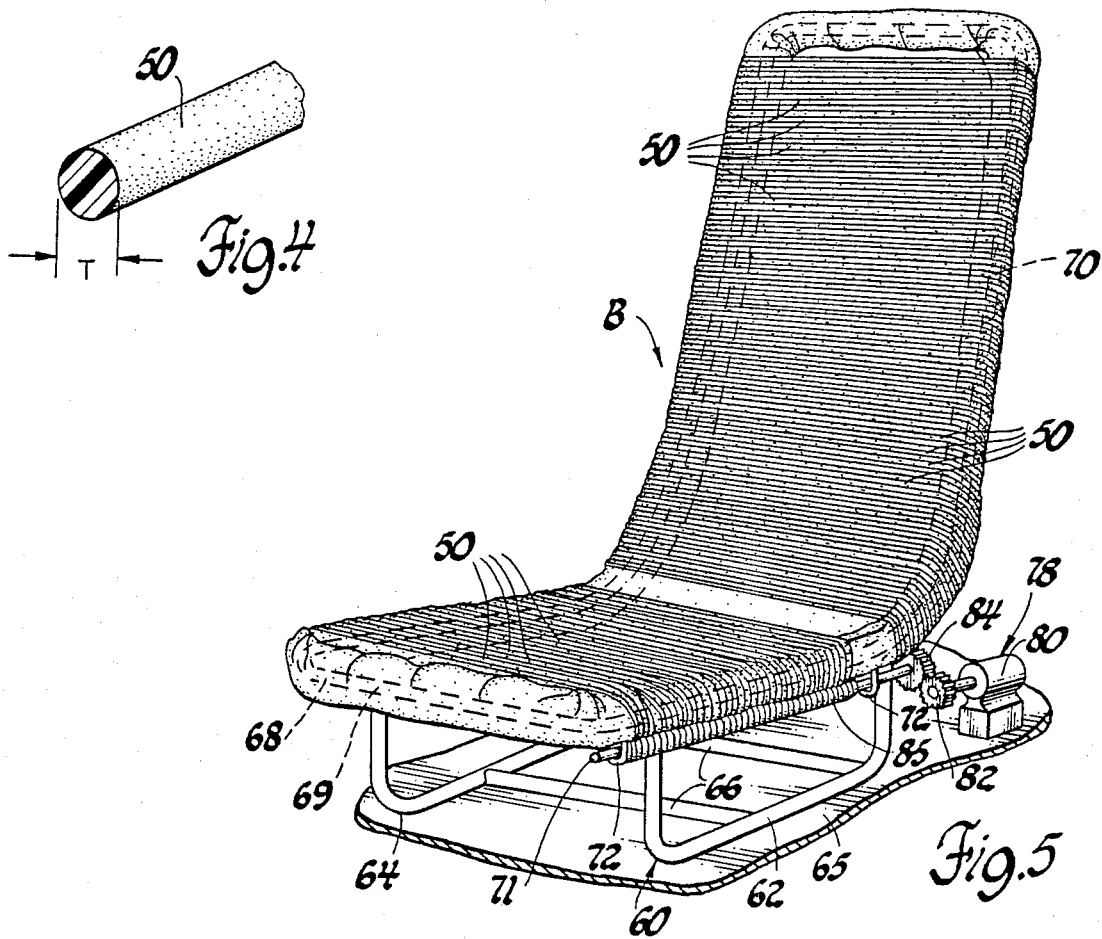
Fig. 4
Fig. 5
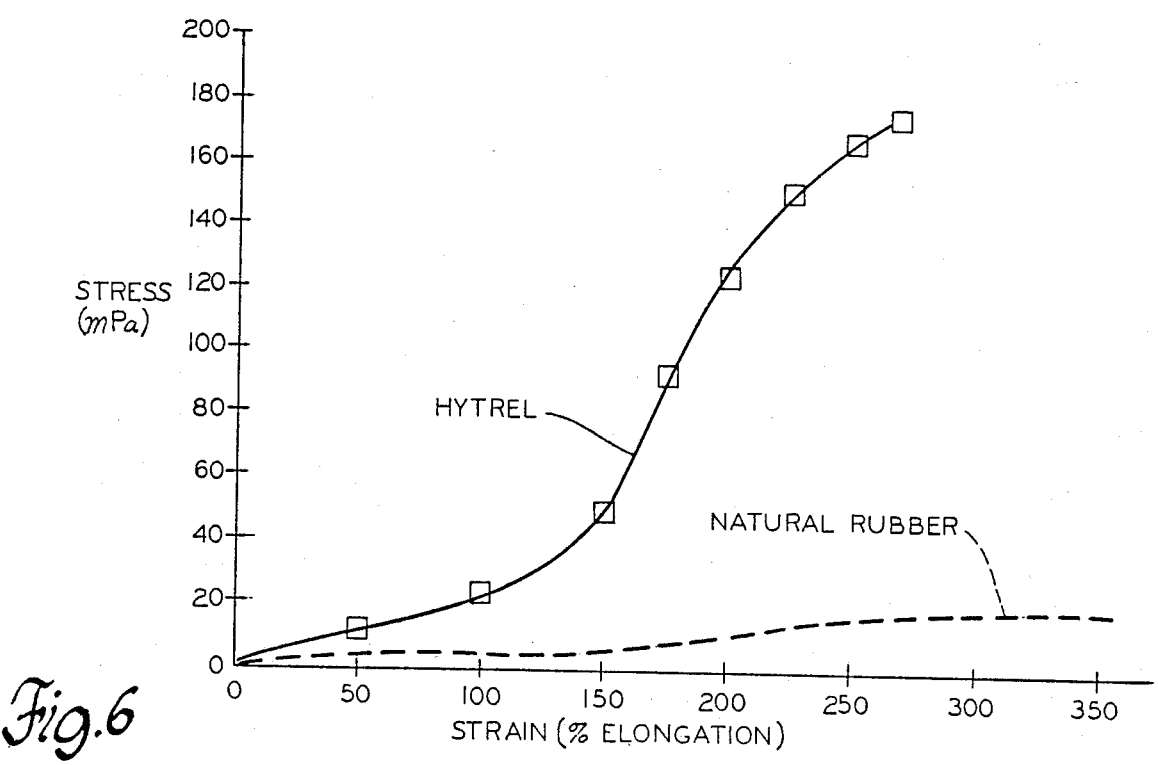
Fig. 6

THIN ELASTOMERIC SEAT

The present invention relates to a vehicle seat and more particularly, to a thin vehicle seat having a multiplicity of side by side elastomeric filaments prestretched across spaced side frames.

Current production vehicle seats usually contain bulky polyurethane stuffing material. This makes such seats relatively heavy and with a thickness such that little room is left beneath the seats. It has also been proposed to provide thin seats for vehicles, including thin seats using elastomeric seat backing material. For example, in Blair et al, No. 2,251,318, solid rubber tape or strips reinforced by fabric are stretched over a seat frame. As noted in the Blair et al patent, stretched elastomers have good properties for isolation and absorption of impacts and vibrations and readily deform to fit the shape of the body of the occupant they support.

A disadvantage of using conventional elastomers is that they have too low a modulus of elasticity. They'll support a person comfortably under static conditions, but when a vehicle hits a bump or pothole they stretch causing the seat to deflect and bottom out and then rebound. This is presumably the reason the rubber strips in Blair et al were combined with fabric even though that lessens the ability of the strips to conform to the shape of the body of the occupant they support.

In accordance with the provisions of the present invention, a thin vehicle seat is provided in which a multiplicity of side by side elastomeric filaments having a diameter between 0.2 and 2 mm and made from a material having a substantially higher tensile strength and a substantially higher modulus of elasticity at 100% elongation than natural rubber are stretched in the range between 20 and 100% elongation across two spaced side frames. The individual elastomeric filaments conform to the contour of the body of the occupant and provide a seat which is more comfortable than if the elastomers were in the shape of rubber strips.

Accordingly, it is an object of the present invention to provide a new and improved thin vehicle seat in which a multiplicity of individual side by side located elastomeric filaments having a diameter between 0.2 and 2 mm, preferably 0.5 mm, and whose opposite sides are attached to spaced side frames so that the filaments extend perpendicular to the side frames, and wherein the elastomeric filaments are made from a material having a substantially higher tensile strength and a substantially higher modulus of elasticity at 100% elongation than natural rubber and are prestretched between 20 and 100% elongation when attached to the side frames.

Another object of the present invention is to provide a new and improved vehicle seat, as defined in the preceding object, and in which the elastomeric filaments are made from a block copolymer consisting of polytetramethylene terephthalate polyester and polytetramethylene ether.

Yet another object of the present invention is to provide a new and improved thin vehicle seat, as defined in the preceding objects, and in which the seat has means for varying the tension of the elastomeric filaments.

The present invention further resides in various novel constructions and arrangement of parts, and further objects, novel characteristics and advantages of the present invention will be apparent to those skilled in the art to which it relates and from the following detailed description of the illustrated, embodiments thereof made with reference to the accompanying drawings forming a part of this specification and in which similar reference numerals are employed to designate corresponding parts throughout the several views, and in which:

FIG. 1 is a perspective view of the novel vehicle seat of the present invention and showing the same in its completed form;

FIG. 2 is a perspective view of a seat frame comprising part of the novel seat of the present invention;

FIG. 3 is a perspective view of the vehicle seat frame and showing elastomeric filaments stretched thereacross and secured to the seat frame;

FIG. 4 is a fragmentary perspective view of a filament used in making the novel seat of the present invention;

FIG. 5 is a perspective view of another embodiment of the novel seat of the present invention; and FIG. 6 is a stress strain curve of an oriented Hytrel ® filament and a typical rubber formulation filament.

Referring to FIGS. 1-3 of the drawings, a novel vehicle seat or seat assembly A is thereshown. The seat assembly A comprises, in general, a frame means 10, a seat support 12, a backrest support 14, a covering 16 for the seat support 12 and a covering 18 for the back support 14.

The seat frame means 10 comprises a pair of spaced tubular seat side frames 20 and 22. The side frames 20 and 22 have contoured upper portions 20a and 22a, bottom portions 20b and 22b which are adapted to rest against the vehicle floor, front end portion 20c and 22c and rear end portions 20d and 22d, respectively. The side frames 20 and 22 also include vertical braces or plates 20e and 22e suitably welded to the upper portions 20a and 22a and bottom portions 20b and 22b adjacent the front ends 20c and 22c, respectively. The seat side frames 20 and 22 in addition include a rearward brace or plate 20f and 22f which is suitably welded to the upper portions 20a and 22a, the lower portions 20b and 22b and the end portions 20d and 22d, respectively. The braces 20e and 20f and 22e and 22f prevent the upper portions 20a and 22a from bending. Suitably welded to the braces 20e and 22e is a cross brace 24. The upper portions 20a and 22a each have a pair of spaced hooks 26 and 28 welded thereto and which extend downwardly and then inwardly toward the center of the front seat frame, and for a reason to be hereinafter more fully described. The seat side frames 20 and 22 also include a rear cross brace 29 welded to the rear end portions 20d and 22d thereof.

The seat frame 10 also includes a backrest frame 30. The backrest frame 30 is tubular and is of a generally inverted U-shape, but contoured as best shown in FIG. 2. The ends of the U-shaped backframe 30 are suitably welded to the plates 20f and 22f of the side frames 20 and 22, respectively. The backrest frame 30 also includes the cross brace 32 adjacent its lower end, as shown in FIG. 2. The back frame 30 in addition includes a plurality of hooks 40 which are welded to the sides of the backframe 30 and which extend rearwardly and inwardly thereof, and for a reason to be hereinafter more fully described.

The seat 12 comprises a multiplicity of side by side elastomeric filaments 50 extending perpendicular to the side frames 20 and 22. The filaments 50 have their opposite ends secured to rods 52 (only one of which is shown) which are contoured or shaped so as to be complementary with the upper portions 20a and 22a of the side frames 20 and 22, respectively. The seat 12 is assembled by placing the rod 52 within the hooks 28 and then stretching the filaments 50 over and across the seat and placing the other rod 52 within the hooks 26.

Likewise the backrest unit comprises a multiplicity of side by side elastomeric filaments 50 having their opposite ends suitably secured to a pair of rods 54 and 56. The backrest 14 is assembled by placing rod 56 within a pair of hooks 40 and then stretching the filaments over and across the backrest and placing the rod 54 within the other hooks 40. The rods 54 and 56 are contoured to the shape of the side frame 30.

The elastomeric filaments 50 are comprised of a block copolymer of: polytetramethylene terephthalate polyester and poly(tetramethylene ether). This material is a combination of hard crystalline segments of the polyester and soft amorphous segments of the poly ether. Annealing the filaments at a specific temperature while they are stretched orients the polyester molecules in one direction while leaving the poly ether molecules unaffected. This increases the material stiffness and more than triples its strength. An example of such a material is Hytrel, a registered trademark of the E. I. DuPont DeNemours Company and this material will be hereinafter referred to as Hytrel.

The Hytrel filaments have a diameter T (see FIG. 4) between 0.2 to 2 mm, but preferably are approximately 0.5 mm in diameter. The Hytrel filaments 50 when attached to the seat frame 10 are prestretched between 50 and 75% strain to provide a feeling of softness for good support.

Hytrel has at least five times the modulus of elasticity of ordinary or natural rubber. Referring to the chart shown in FIG. 6, the stress strain curve for ordinary rubber is depicted by the dotted lines and the stress strain curve for Hytrel is depicted by the solid line. On the left side of the graph the stress is measured in megapascals and the strain is measured in percent elongation. The oriented Hytrel filament has a much higher ultimate tensile strength (170 mpa) and a much higher modulus of elasticity at 100% elongation (20 mpa) than the natural rubber (18 and 3 mpa, respectively). The Hytrel stress strain curve tends to plateau in the range of strain between 20 and 100% elongation. Thus, filaments prestretched in this range will provide good comfort and they'll easily deflect to adjust to the shape of the occupant. However, with a sudden change of stress, it will stiffen at strains above 100% to support the additional load.

As noted hereinbefore, the Hytrel filaments in the seat 12 are prestretched between 50 and 75% elongation. Under these conditions the amount of thickness or space required to allow for maximum deflection during expectant use of a vehicle is approximately 75 mm thickness or clearance. This allows for the seat to be very thin and/or allows for space under the seat for leg room for rear passengers.

The seat back 14 has its elastomeric filaments 50 prestretched approximately 20% to provide for the support and comfort needed.

It has been found that with the use of Hytrel filaments of approximately 0.5 mm diameter that only about six filaments per centimeter are required in the seat if the filaments are prestretched between 50 and 75% strain. It has also been found that with the seat back 14 having filaments 50 prestretched to 20% strain, that only approximately 2.75 filaments per centimeter are required.

It has also been found that with the use of Hytrel filaments, the stress strain measurements thereof show that they have good hystersis—that is, the stress at a given strain during stretching was much higher than during release of stress. This is desirable because it means that much of the energy absorbed during stretching is dissipated and not regained when the filament is relaxed. The result is better dampening of impacts.

It should be apparent that with the use of Hytrel filaments a very comfortable thin seat is provided which has good dampening characteristics and which is very thin compared to conventional car seats.

For aesthetic reasons, the preferred embodiment utilizes suitable covers 16 and 18 for covering the filaments 50 of the seat 12 and the filaments 50 of the seatback unit 14.

FIG. 5 shows an alternate embodiment of the novel seat assembly B of the present invention. The seat assembly B comprises a seat frame 60 having a pair of spaced side support frames 62 and 64 suitably secured to a floor portion 65 of a vehicle and a pair of cross braces 66. The seat support frame 60 is made of tubular material and supports the one piece tubular seat support frame 68 by being welded thereto in a manner well known to those skilled in the art. The seat support frame includes a seat portion 69 and a backrest portion 70. The seat and backrest portions 69 and 70 include side by side Hytrel filaments 50 which are identical to the Hytrel filaments previously described and which are stretched across the frame 68 so as to be perpendicular to the sides 62 and 64 of the seat, and in the same manner as previously described in connection with the seat assembly A. Again the filaments 50 would have their opposite ends secured to rods 71 which in turn are secured to hooks 72 on the underside of the seat assembly B.

The embodiment shown in FIG. 5 differs from that shown in FIGS. 1–3 in that a means 78 is provided for adjusting the tension of the filaments 50 on the seat portion 69. To this end, there is provided a suitable electric motor 80 supported by the floor 65 of the vehicle which in turn, when energized, rotates a gear 82 which is in meshed engagement with a gear 84 on the support rod 71. The rod 71 is rotatably supported by the hooks 72. Energizing the motor 80 rotates the rod 71 to increase or decrease the tension of the filaments 50 of the seat portion 69 depending upon which direction the motor 80 is rotated.

From the foregoing, it should be apparent that novel seat assemblies have been provided which are thin, give great comfort, are of less weight than conventional foam seats, and which are high-strength, and provide good hysteresis characteristics.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A vehicle seat assembly comprising,
   tubular frame means including laterally spaced, generally horizontal side frame portions for supporting a seat and laterally spaced, generally vertically extending side frame portions for supporting a backrest, said seat and backrest each comprising a multiplicity of individual side by side located elastomeric filaments of a diameter between 0.2 to 2.0 millimeters, and whose opposite ends are attached to said side frame portions so that the filaments extend perpendicular to said side frame portions whereby said seat and backrest have a thickness which is thin, said elastomeric filaments being made from a material having a substantially higher tensile strength and a modulus of elasticity at 100 percent elongation which is at least five times more than natural rubber, and said elastomeric filaments being prestretched in the range between 20 and 100 percent elongation when attached to said side frame portions.

2. A vehicle seat assembly comprising, tubular frame means including laterally spaced, generally horizontal side frame portions for supporting a seat and laterally spaced, generally vertically extending side frame portions for supporting a backrest, said seat and backrest each comprising a multiplicity of individual side by side located elastomeric filaments having an approximate diameter of 0.5 millimeters and whose opposite ends are attached to said side frame portions so that the filaments extend perpendicular to said side frame portions whereby said seat and backrest have a thickness which is thin, said elastomeric filaments being made from a block copolymer consisting of polytetramethylene terephthalate polyester and polytetramethylene ether, said elastomeric filaments having a modulus of elasticity at 100 percent elongation which is at least five times more than natural rubber, said elastomeric filaments being prestretched in the range between 20 and 100 percent elongation when attached to said side frame portions, and means for varying the tension of the elastomeric filaments.

3. A vehicle seat assembly comprising, tubular frame means including laterally spaced, generally horizontal side frame portions for supporting a seat and laterally spaced, generally vertically extending side frame portions for supporting a backrest, said seat and backrest each comprising a multiplicity of individual side by side located elastomeric filaments having an approximate diameter of 0.5 millimeters and whose opposite ends are attached to said side frame portions so that the filaments extend perpendicular to said side frame portions whereby said seat and backrest have a thickness which is thin, said elastomeric filaments being made from a block copolymer consisting of polytetramethylene terephthalate polyester and polytetramethylene ether, said elastomeric filaments having a modulus of elasticity at 100 percent elongation which is at least five times more than natural rubber, said elastomeric filaments being prestretched in the range between 20 and 100 percent elongation when attached to said side frame portions, said seat having about six filaments per centimeter and said backrest having about three filaments per centimeter.

* * * * *